US009807309B2

(12) United States Patent
Nitaki

(10) Patent No.: US 9,807,309 B2
(45) Date of Patent: Oct. 31, 2017

(54) IMAGE DISPLAY DEVICE AND METHOD, IMAGE GENERATION DEVICE AND METHOD, AND PROGRAM FOR CONDITIONALLY DISPLAYING IMAGE INFORMATION

(71) Applicant: Takashi Nitaki, Kanagawa (JP)

(72) Inventor: Takashi Nitaki, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/147,769

(22) Filed: May 5, 2016

(65) Prior Publication Data

US 2016/0248982 A1 Aug. 25, 2016

Related U.S. Application Data

(62) Division of application No. 14/239,434, filed as application No. PCT/JP2012/071100 on Aug. 21, 2012, now Pat. No. 9,357,135.

(30) Foreign Application Priority Data

Aug. 29, 2011 (JP) ................................. 2011-185658

(51) Int. Cl.
*H04N 5/77* (2006.01)
*H04N 5/232* (2006.01)
(Continued)

(52) U.S. Cl.
CPC ....... *H04N 5/23293* (2013.01); *H04N 1/2125* (2013.01); *H04N 5/23219* (2013.01);
(Continued)

(58) Field of Classification Search
CPC ........... H04N 1/00183; H04N 1/00506; H04N 1/00824; H04N 1/2125; H04N 1/2392;
(Continued)

(56) References Cited

U.S. PATENT DOCUMENTS 5,913,078 A * 6/1999 Kimura ................. G01S 19/235
396/310
7,587,276 B2 * 9/2009 Gold ...................... G01C 21/26
340/989

(Continued)

FOREIGN PATENT DOCUMENTS

CN  101021873  8/2007
EP  1818838  8/2007
(Continued)

OTHER PUBLICATIONS

International Search Report corresponding to PCT/JP2012/071100, Nov. 13, 2012, 7 pages.
(Continued)

*Primary Examiner* — Hung Lam
(74) *Attorney, Agent, or Firm* — Wilmer Cutler Pickering Hale and Dorr LLP

(57) ABSTRACT

An image display device that displays image information includes an image retrieving unit that retrieves image information; a device status identifying unit that identifies a status of the present device; an image condition specifying unit that specifies an image condition that indicates a condition which the image information needs to satisfy to be displayed, based on the status identified by the device status identifying unit; and a display unit that displays the image information retrieved by the image retrieving unit if the image information satisfies the image condition specified by the image condition specifying unit.

7 Claims, 10 Drawing Sheets

(51) Int. Cl.
*H04N 1/21* (2006.01)
*H04N 9/31* (2006.01)
*H04N 9/82* (2006.01)

(52) U.S. Cl.
CPC ............ *H04N 5/77* (2013.01); *H04N 9/3191* (2013.01); *H04N 9/8205* (2013.01); *H04N 5/23222* (2013.01); *H04N 2201/3253* (2013.01)

(58) Field of Classification Search
CPC ............ H04N 9/3191; H04N 5/23219; H04N 5/23222; H04N 1/624; H04N 21/44218; H04N 1/00466; H04N 21/422; H04N 2201/3253

USPC .............. 348/139, 169, 333.01, 333.12, 563
See application file for complete search history.

(56) References Cited

U.S. PATENT DOCUMENTS

| | | |
|---|---|---|
| 8,880,338 B2 | 11/2014 | Inami et al. |
| 2006/0158534 A1 | 7/2006 | Gotohda |
| 2007/0203897 A1 | 8/2007 | Ueno et al. |
| 2009/0052729 A1 | 2/2009 | Bae |
| 2011/0069201 A1 | 3/2011 | Kawanishi et al. |
| 2012/0019557 A1 | 1/2012 | Aronsson et al. |
| 2012/0101722 A1 | 4/2012 | Inami et al. |
| 2012/0268621 A1* | 10/2012 | Kanma .................. H04N 5/225 348/222.1 |
| 2012/0313851 A1 | 12/2012 | Kasahara |

FOREIGN PATENT DOCUMENTS

| | | |
|---|---|---|
| JP | 2000-217057 A | 8/2000 |
| JP | 2006-133947 A | 5/2006 |
| JP | 2007-214906 | 8/2007 |
| JP | 2007-219615 | 8/2007 |
| JP | 2008-147865 A | 6/2008 |
| JP | 2008-269305 A | 11/2008 |
| JP | 2009-171412 A | 7/2009 |
| JP | 2010-098697 A | 4/2010 |
| JP | 2010-157960 | 7/2010 |
| JP | 2010-263341 A | 11/2010 |
| JP | 2011-007701 | 1/2011 |
| JP | 2011-007703 | 1/2011 |
| KR | 10-2007-0082027 | 8/2007 |
| TW | 200805096 | 1/2008 |
| WO | WO-2010/150892 | 12/2010 |

OTHER PUBLICATIONS

Extended European Search Report corresponding to European Application No. 12827418.0, dated Jul. 3, 2015, 10 pages.
Japanese Office Action issued in corresponding Japanese Application No. 2013-531224, dated Aug. 9, 2016, 4 pages.
Japanese Office Action issued in corresponding Japanese Application No. 2016-219047, dated Sep. 12, 2017, 6 pages.

* cited by examiner

IMAGE DISPLAY DEVICE AND METHOD, IMAGE GENERATION DEVICE AND METHOD, AND PROGRAM FOR CONDITIONALLY DISPLAYING IMAGE INFORMATION

The present application is a divisional of U.S. patent application Ser. No. 14/239,434 which was filed on Feb. 18, 2014, which is a national stage application of International Application No. PCT/JP2012/071100 entitled "Image Display Device and Method, Image Generation Device and Method, and Program," filed on Aug. 21, 2012, which claims priority to Japanese Patent Application No. 2011-185658, filed Aug. 29, 2011. The contents of each application are incorporated herein by reference.

TECHNICAL FIELD

The present invention relates to an image display device and an image display method for displaying image information, an image generation device and an image generation method for generating image information, and a program.

BACKGROUND ART

Recently, electronic imaging devices such as digital cameras have become popular, which makes users easily generate image information. In addition, such electronic imaging devices have viewer functions by which users can browse to obtained image information.

Owing to recent progress in information technology, an amount of data that can be stored in an internal memory or an external storage medium of an electronic imaging device has become huge. Accordingly, the electronic imaging device can hold a large amount of image information.

However, when a large amount of image information is stored in an electronic imaging device, it may be difficult for a user, who wants to browse images, to reach target images.

For such a problem, Patent-Document 1 discloses a technique in which information of each obtained image is associated with location information when the image is obtained, and if a predetermined result is obtained by comparing location information obtained at browsing with the location information of the image information, a specific message and the relevant image information are displayed.

PRIOR ART DOCUMENT

Patent Document

Patent Document 1: Japanese Unexamined Patent Application, First Publication No. 2007-214906.

DISCLOSURE OF INVENTION

Problem to be Solved by the Invention

However, Patent-Document 1 is unclear about how to compare image information items and what obtained result makes a photo to be displayed. Additionally, in order for a user to appropriately select image information associated with the actual location from among a plurality of target image information items, the user should judge whether each image information item associates with the actual location in accordance with the surrounding circumstances or the image information.

In light of the above circumstances, an object of the present invention is to provide an image display device and an image display method, which make it possible to select appropriate image information, as image information to be displayed, from among a plurality of image information items, and, an image generation device and an image generation method of generating an image utilized for such selection, and a program.

Means for Solving the Problem

In order to achieve the above object, the present invention provides an image display device that displays image information, the device comprising:

an image retrieving unit that retrieves image information;

a device status identifying unit that identifies a status of the present device;

an image condition specifying unit that specifies an image condition that indicates a condition which the image information needs to satisfy to be displayed, based on the status identified by the device status identifying unit; and a display unit that displays the image information retrieved by the image retrieving unit if the image information satisfies the image condition specified by the image condition specifying unit.

The present invention also provides an image display device that displays image information, the device comprising:

an image retrieving unit that retrieves image information;

a device condition specifying unit that specifies, based on the image information retrieved by the image retrieving unit, a device condition that indicates a condition which the present device needs to satisfy to display the image information; and a display unit that displays the image information if a status of the present device satisfies the device condition specified by the device condition specifying unit.

The present invention also provides an image generation device that generates image information, the device comprising:

an image generation unit that generates image information;

a device status identifying unit that identifies a status of the present device when the image generation unit generated the image information; and a device condition attaching unit that attaches, based on the status identified by the device status identifying unit, a device condition to the image information generated by the image generation unit, where the device condition indicates a condition which a device used to display the image condition needs to satisfy to display the image information.

The present invention provides an image display method utilizing an image display device that displays image information, wherein:

an image retrieving unit retrieves image information;

a device status identifying unit identifies a status of the present device;

an image condition specifying unit specifies an image condition that indicates a condition which the image information needs to satisfy to be displayed, based on the status identified by the device status identifying unit; and a display unit displays the image information retrieved by the image retrieving unit if the image information satisfies the image condition specified by the image condition specifying unit.

The present invention provides an image display method utilizing an image display device that displays image information, wherein:

an image retrieving unit retrieves image information;

a device condition specifying unit specifies, based on the image information retrieved by the image retrieving unit, a device condition that indicates a condition which the present device needs to satisfy to display the image information; and a display unit that displays the image information if a status of the present device satisfies the device condition specified by the device condition specifying unit.

The present invention provides an image generation method utilizing an image generation device that generates image information, wherein:

an image generation unit generates image information;

a device status identifying unit identifies a status of the present device when the image generation unit generated the image information; and a device condition attaching unit attaches, based on the status identified by the device status identifying unit, a device condition to the image information generated by the image generation unit, where the device condition indicates a condition which a device used to display the image condition needs to satisfy to display the image information.

The present invention provides a program by which an image display device that displays image information functions as:

an image retrieving unit that retrieves image information;

a device status identifying unit that identifies a status of the present device;

an image condition specifying unit that specifies an image condition that indicates a condition which the image information needs to satisfy to be displayed, based on the status identified by the device status identifying unit; and a display unit that displays the image information retrieved by the image retrieving unit if the image information satisfies the image condition specified by the image condition specifying unit.

The present invention provides a program by which an image display device that displays image information functions as:

an image retrieving unit that retrieves image information;

a device condition specifying unit that specifies, based on the image information retrieved by the image retrieving unit, a device condition that indicates a condition which the present device needs to satisfy to display the image information; and a display unit that displays the image information if a status of the present device satisfies the device condition specified by the device condition specifying unit.

The present invention provides a program by which an image generation device that generates image information functions as:

an image generation unit that generates image information;

a device status identifying unit that identifies a status of the present device when the image generation unit generated the image information; and a device condition attaching unit that attaches, based on the status identified by the device status identifying unit, a device condition to the image information generated by the image generation unit, where the device condition indicates a condition which a device used to display the image condition needs to satisfy to display the image information.

Effect of the Invention

In accordance with the present invention, in a relationship between an image display device and image information, the image display device displays the image information if a device condition specified in accordance with a current status of the present device or an image condition included in the image information is satisfied. Accordingly, the image display device can select appropriate image information to be displayed, from among a plurality of image information items.

MODE FOR CARRYING OUT THE INVENTION

First Embodiment

Below, embodiments of the present invention will be explained in detail with reference to the drawings.

Figure 1:
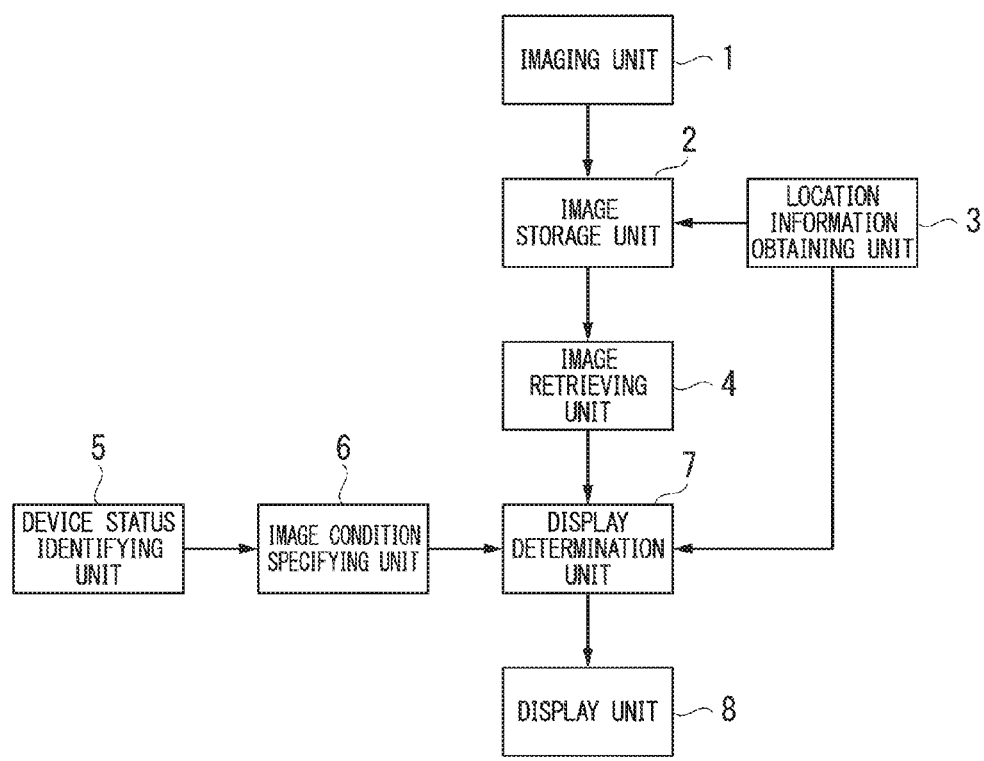
FIG. 1 is a general block diagram that shows the structure of a portable terminal in accordance with a first embodiment.

FIG. 1 is a general block diagram that shows the structure of a portable terminal in accordance with a first embodiment.

The portable terminal (i.e., an image display device) of the first embodiment executes a camera application and a viewer application. Among image information items obtained by the camera application, the portable terminal displays, by executing the viewer application, items which satisfies a condition that the difference between the location at which the relevant image information was generated and the actual (or current) location of the image display device is within a predetermined range.

The portable terminal includes an imaging unit 1 (an image generation unit), an image storage unit 2, a location information obtaining unit 3, an image retrieving unit 4, a device status identifying unit 5, an image condition specifying unit 6, a display determination unit 7, and a display unit 8.

When a camera application of the portable terminal has been executed, the imaging unit 1 performs an imaging process by means of an optical system (not shown) built in the portable terminal so as to generate image information. In addition, the imaging unit 1 stores the generated image information in the image storage unit 2.

The location information obtaining unit 3 obtains the location of the portable terminal at the time the camera application of the portable terminal was executed, by means of a GPS (Global Positioning System) function. The location information obtaining unit 3 stores the relevant location information into the image storage unit 2 in a manner such that the location information is associated with the corresponding image information obtained by the imaging unit 1. The location information obtaining unit 3 also obtains the location of the portable terminal at the time the viewer application of the portable terminal was executed.

As described above, the image storage unit 2 stores the image information obtained by the imaging unit 1 and the location information that indicates a location at which the relevant image information was obtained.

When the viewer application has been executed, the image retrieving unit 4 retrieves image information from the image storage unit 2.

The device status identifying unit 5 identifies, as circumstantial information on the portable terminal, whether or not the portable terminal is located indoors or outdoors.

Figure 2:
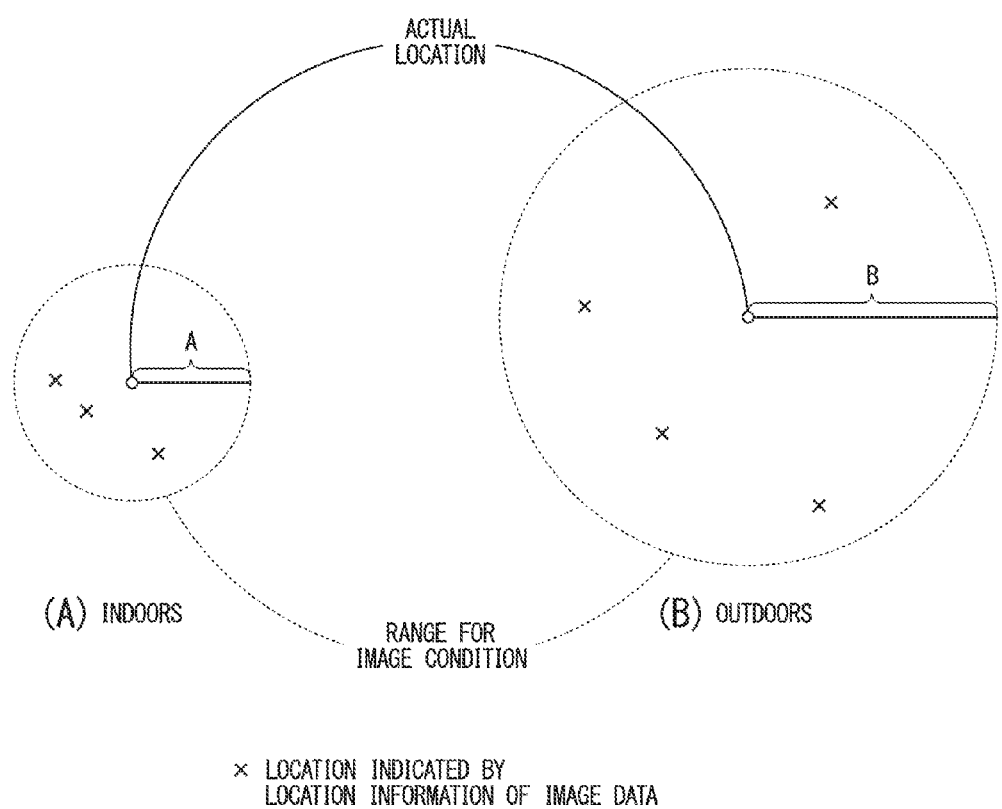
FIG. 2 is a diagram that shows an image condition defined in the first embodiment.

FIG. 2 is a diagram that shows an image condition defined in the first embodiment.

Based on a circumstantial status identified by the device status identifying unit 5, the image condition specifying unit 6 specifies an image condition so as to display the image information retrieved by the image retrieving unit 4, that is, a condition that the image information needs to satisfy.

More specifically, as shown in part (A) of FIG. 2, when the portable terminal is located indoors, the image condition specifying unit 6 sets an image condition such that the image information was obtained within a circular range defined by a radius A around the actual location as the center of the circle.

On the other hand, as shown in part (B) of FIG. 2, when the portable terminal is located outdoors, the image condition specifying unit 6 sets an image condition such that the image information was obtained within a circular range defined by a radius B (A<B) around the actual location as the center of the circle.

The display determination unit 7 determines whether or not the location information included in the image information retrieved by the image retrieving unit 4 and the location information obtained by the location information obtaining unit 3 have a relationship that satisfies the image condition set by the image condition specifying unit 6. The display determination unit 7 outputs each image information item that satisfies the image condition to the display unit 8.

The display unit 8 displays the image information received from the display determination unit 7 on a display (not shown) of the portable terminal.

Below, an operation of the portable terminal in accordance with the first embodiment will be explained.

Figure 3:
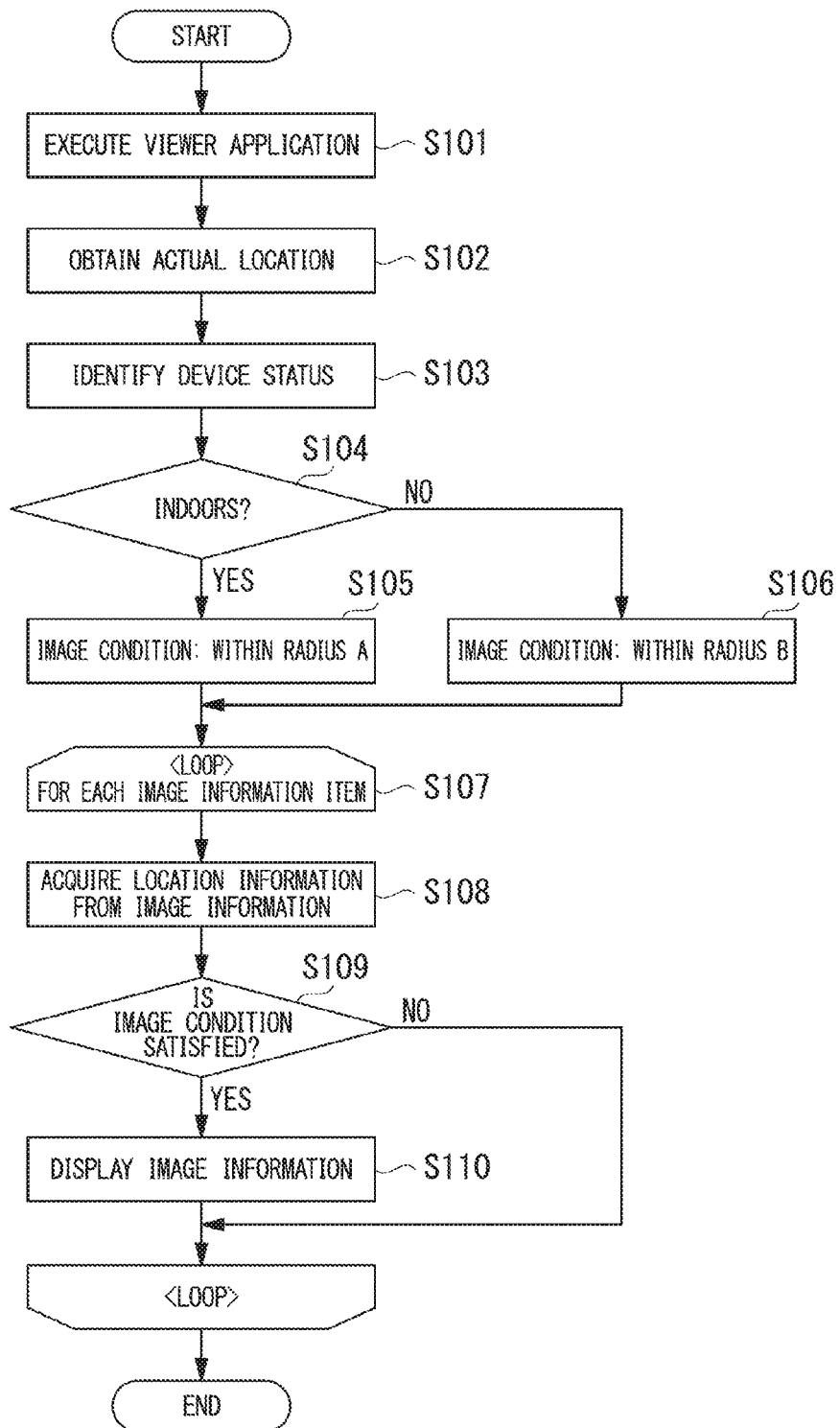
FIG. 3 is a flowchart that shows an image displaying operation of the portable terminal in accordance with the first embodiment.

FIG. 3 is a flowchart that shows an image displaying operation of the portable terminal in accordance with the first embodiment.

When the portable terminal executes the viewer application in response to a user's operation (see step S101), the location information obtaining unit 3 obtains location information that indicates the location of the portable terminal at the current time (see step S102). Next, the device status identifying unit 5 identifies a device status that indicates whether or not the portable terminal is located indoors or outdoors (see step S103).

Below, a method for identifying whether or not the portable terminal is located indoors or outdoors will be explained.

For example, the device status identifying unit 5 activates the imaging unit 1, and can identify that the portable terminal is located outdoors if the distance from the portable terminal to a subject, that may be computed utilizing an autofocusing function of the imaging unit 1, is greater than or equal to a predetermined threshold. In another example, the device status identifying unit 5 collects peripheral sounds via a microphone of the portable terminal, and can identify that the portable terminal is located indoors if the collected sounds include an echo. In a case in which a sound or light wave transmitter and receiver is provided in the portable terminal, the device status identifying unit 5 can identify that the portable terminal is located indoors if a time from the transmission to the reception of the sound or light wave signal is within a predetermined value.

The above-described methods are each an example of the method of identifying "whether outdoors or indoors", that can be identified by any other method.

After identifying the device status by the device status identifying unit 5 in step S103, the image condition specifying unit 6 refers to the device status and determines whether or not the portable terminal is located indoors (see step S104).

If determining that the portable terminal is located indoors (i.e., "YES" in step S104), the image condition specifying unit 6 sets an image condition such that image information is displayed if location information included in the image information indicates a location within a circular range defined by radius A around the actual location of the present device as the center of the circle (see step S105).

On the other hand, if determining that the portable terminal is located outdoors (i.e., "NO" in step S104), the image condition specifying unit 6 sets an image condition such that image information is displayed if location information included in the image information indicates a location within a circular range defined by radius B (A<B) around the actual location of the present device as the center of the circle (see step S106).

After the image condition specifying unit 6 specifies the image condition in step S105 or S106, the portable terminal repeatedly executes the following steps S108 to S110 for respective image information items stored in the image storage unit 2 (see step S107).

First, the image retrieving unit 4 retrieves image information (an image information item) from the image storage unit 2, and acquires location information from the retrieved image information (see step S108).

Next, the display determination unit 7 determines whether or not the location information obtained in step S102 by the location information obtaining unit 3 and the location information acquired in step S108 by the image retrieving unit 4 have a relationship that satisfies the image condition specified in step S105 or S106 by the image condition specifying unit 6 (see step S109).

That is, the display determination unit 7 determines whether or not the location information acquired in step S108 by the image retrieving unit 4 indicates a location within a circular range defined by radius A or B (corresponding to the image condition) around the location (as the center of the circle) indicated by the location information obtained in step S102 by the location information obtaining unit 3.

If it is determined by the display determination unit 7 that the image condition is satisfied (i.e., "YES" in step S109), the display determination unit 7 outputs the image information retrieved by the image retrieving unit 4 to the display unit 8. The display unit 8 then displays the image information received from the display determination unit 7 on the display (see step S110).

In contrast, if it is determined by the display determination unit 7 that the image condition is not satisfied (i.e., "NO" in step S109), the display unit 8 does not display the image information retrieved by the image retrieving unit 4.

After the process from step S108 to step S110 is repeatedly executed so that all image information items stored in the image storage unit 2 are processed, the portable terminal completes the relevant operation.

As described above, according to the present embodiment, the image condition specifying unit 6 specifies the image condition based on the status identified by the device status identifying unit 5, and the display unit 8 displays image information retrieved by the image retrieving unit 4 if the image information satisfies the image condition specified by the image condition specifying unit 6. Therefore, the portable terminal can select appropriate image information to be displayed, from among a plurality of image information items.

In addition, the image condition in the present embodiment is such that if location information included in image information retrieved by the image retrieving unit 4 indicates a location within a predetermined range defined based on the actual location of the present device, the image information is displayed. Therefore, based on the status identified by the device status identifying unit 5, the image condition specifying unit 6 specifies the range for the image condition. Accordingly, the portable terminal can appropriately select image information pertaining to the actual location, from among a plurality of image information items.

Additionally, in the present embodiment, the device status identifying unit 5 identifies whether the present device is located outdoors or indoors. If it is identified by the device status identifying unit 5 that the present device is located indoors, the image condition specifying unit 6 applies a narrower range to the specified image condition than a range that is applied when it is identified that the present device is located outdoors. According to such narrowing the range for the image condition when the user of the portable terminal is within an establishment, it is possible to exclude images which probably do not relate to the relevant establishment. By contrast, according to widening the range for the image condition when the user of the portable terminal is located outdoors, it is possible to display a larger number of images in comparison with a case of performing no widening.

Second Embodiment

Next, a second embodiment of the present invention will be explained.

The device status identifying unit 5 and the image condition specifying unit 6 in the portable terminal of the second embodiment perform processes different from those performed by the corresponding units of the first embodiment.

The device status identifying unit 5 of the second embodiment identifies, as circumstantial information on the portable terminal, whether or not there are lots of obstacles around the portable terminal.

If there are lots of obstacles around the portable terminal, the image condition specifying unit 6 specifies an image condition such that an image of image information was obtained within a circular range of a radius C around the actual location as the center of the circle.

On the other hand, if there are less obstacles around the portable terminal, the image condition specifying unit 6 specifies an image condition such that an image of image information was obtained within a circular range of radius D (C<D) around the actual location as the center of the circle.

Below, an operation of the portable terminal in accordance with the second embodiment will be explained.

Figure 4:
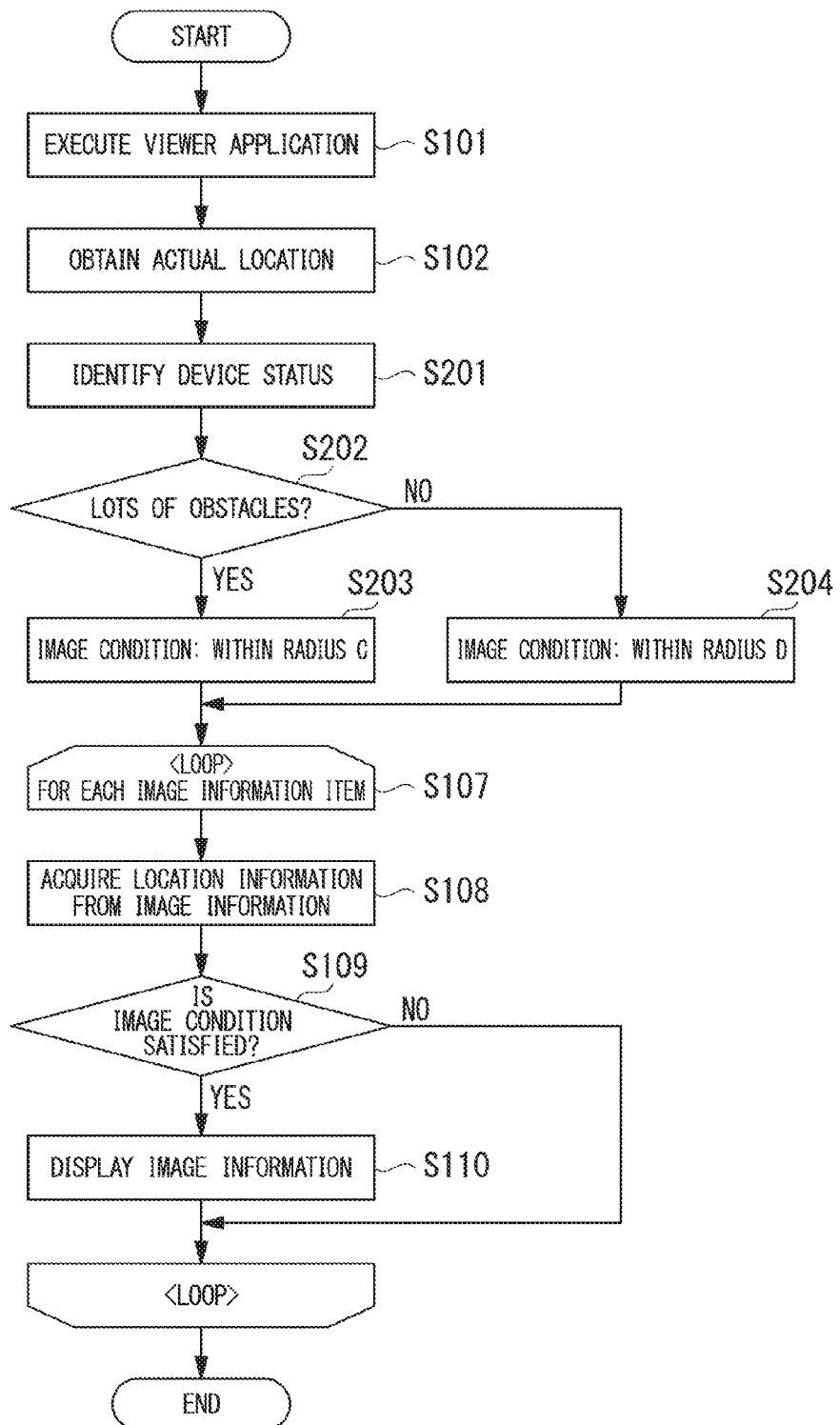
FIG. 4 is a flowchart that shows an image displaying operation of the portable terminal in accordance with a second embodiment.

FIG. 4 is a flowchart that shows an image displaying operation of the portable terminal in accordance with the second embodiment, where steps that perform processes identical to those in the first embodiment are given identical reference symbols.

When the portable terminal executes the viewer application in response to a user's operation (see step S101), the location information obtaining unit 3 obtains location information that indicates the location of the portable terminal at the current time (see step S102). Next, the device status identifying unit 5 identifies a device status that indicates whether or not there are lots of obstacles around the portable terminal (see step S201).

Below, a method for identifying whether or not there are lots of obstacles around the portable terminal will be explained.

For example, the device status identifying unit 5 activates the imaging unit 1, and can identify that there are lots of obstacles around if image information obtained by the imaging unit 1 has a contrast greater than or equal to a predetermined threshold. In another example, the device status identifying unit 5 collects peripheral sounds via a microphone of the portable terminal, and can identify that there are lots of obstacles around if the collected sounds include a plurality of echoes.

In a case in which a sound or light wave transmitter and receiver is provided in the portable terminal, the device status identifying unit 5 can identify that there are lots of obstacles if a plurality of received sound or light wave signals are detected due to a multipath phenomenon.

The above-described methods are each an example of the method of identifying whether or not there are lots of obstacles, that can be identified by any other method.

After identifying the device status by the device status identifying unit 5 in step S201, the image condition specifying unit 6 refers to the device status and determines whether or not there are lots of obstacles around the portable terminal (see step S202).

If determining that there are lots of obstacles around the portable terminal (i.e., "YES" in step S202), the image condition specifying unit 6 sets an image condition such that image information is displayed if location information included in the image information indicates a location within a circular range defined by radius C around the actual location of the present device as the center of the circle (see step S203).

On the other hand, if determining that there are less obstacles around the portable terminal (i.e., "NO" in step S202), the image condition specifying unit 6 sets an image condition such that image information is displayed if location information included in the image information indicates a location within a circular range defined by radius D (C<D) around the actual location of the present device as the center of the circle (see step S204).

After the image condition specifying unit 6 specifies the image condition in step S203 or S204, the portable terminal repeatedly executes the following steps S108 to S110 for respective image information items stored in the image storage unit 2 (see step S107).

First, the image retrieving unit 4 retrieves image information (an image information item) from the image storage unit 2, and acquires location information from the retrieved image information (see step S108).

Next, the display determination unit 7 determines whether or not the location information obtained in step S102 by the location information obtaining unit 3 and the location information acquired in step S108 by the image retrieving unit 4 have a relationship that satisfies the image condition specified in step S203 or S204 by the image condition specifying unit 6 (see step S109).

That is, the display determination unit 7 determines whether or not the location information acquired in step S108 by the image retrieving unit 4 indicates a location within a circular range defined by radius C or D (corresponding to the image condition) around the location (as the center of the circle) indicated by the location information obtained in step S102 by the location information obtaining unit 3.

If it is determined by the display determination unit 7 that the image condition is satisfied (i.e., "YES" in step S109), the display determination unit 7 outputs the image information retrieved by the image retrieving unit 4 to the display unit 8. The display unit 8 then displays the image information received from the display determination unit 7 on the display (see step S110).

In contrast, if it is determined by the display determination unit 7 that the image condition is not satisfied (i.e., "NO" in step S109), the display unit 8 does not display the image information retrieved by the image retrieving unit 4.

After the process from step S108 to step S110 is repeatedly executed so that all image information items stored in the image storage unit 2 are processed, the portable terminal completes the relevant operation.

As described above, according to the present embodiment, the device status identifying unit 5 identifies whether or not there are lots of obstacles around the present device, and the greater the number of obstacles around the present device, the narrower the range specified for the image condition by the image condition specifying unit 6.

According to such narrowing the range for the image condition when the portable terminal is located where there are lots of obstacles, it is possible to exclude images which probably do not relate to a condition that "within a visible range". By contrast, it is possible to display many images within the visible range by widening the range pertaining to the image condition when the portable terminal is located where there are less obstacles.

Third Embodiment

Next, a third embodiment of the present invention will be explained.

The device status identifying unit 5 and the image condition specifying unit 6 in the portable terminal of the third embodiment perform processes different from those performed by the corresponding units of the first embodiment.

The device status identifying unit 5 of the third embodiment identifies, as circumstantial information on the portable terminal, a traveling device and a traveling direction of a user.

Figure 5:
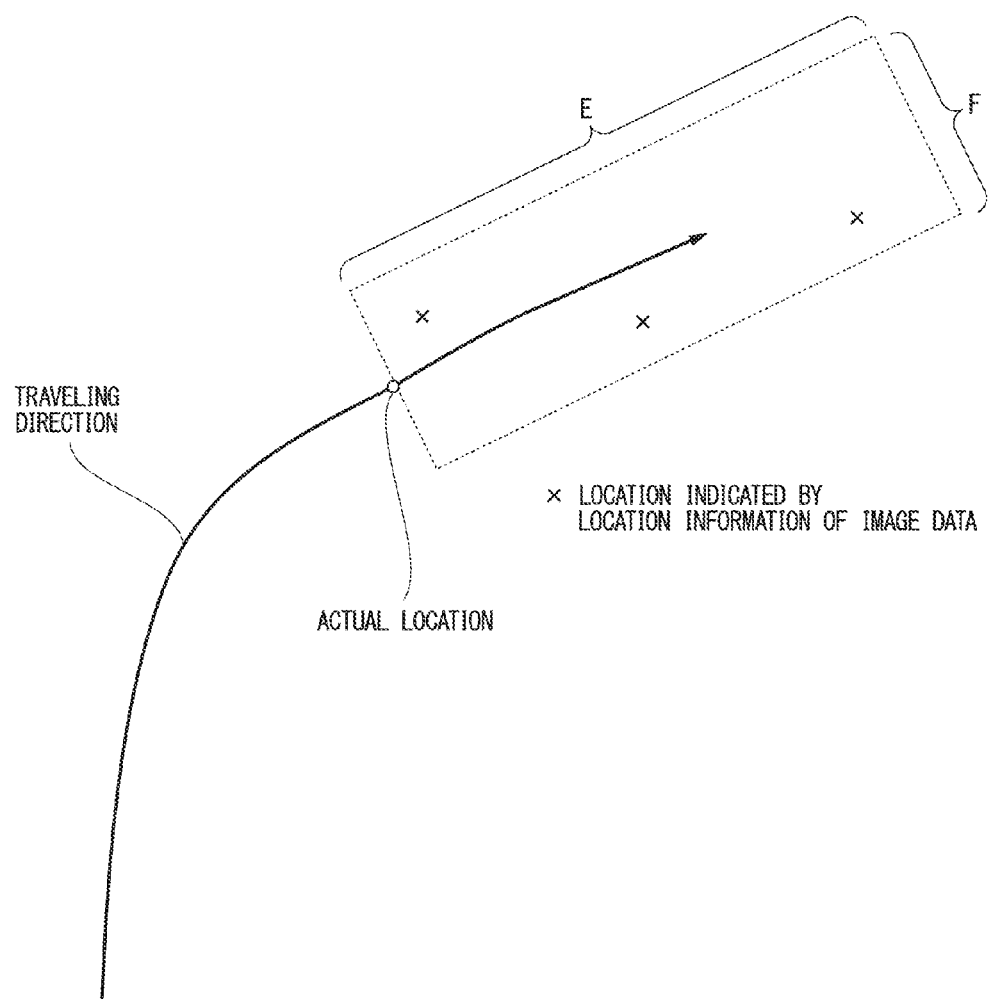
FIG. 5 is a diagram that shows an image condition defined in a third embodiment.

FIG. 5 is a diagram that shows an image condition defined in the third embodiment.

As shown in FIG. 5, when the traveling device of the user is a high-speed traveling device such as an automobile or a train, the image condition specifying unit 6 sets an image condition that the image information was obtained within a rectangular range defined in a manner such that the rectangle extends from the actual location along the traveling direction identified by the device status identifying unit 5 and that the rectangle has a length E in the traveling direction and a width F.

On the other hand, when the traveling device of the user is a low-speed traveling device such as foot or a train, the image condition specifying unit 6 sets an image condition such that the image information was obtained within a circular range defined by radius G around the actual location as the center of the circle.

Below, an operation of the portable terminal in accordance with the third embodiment will be explained.

Figure 6:
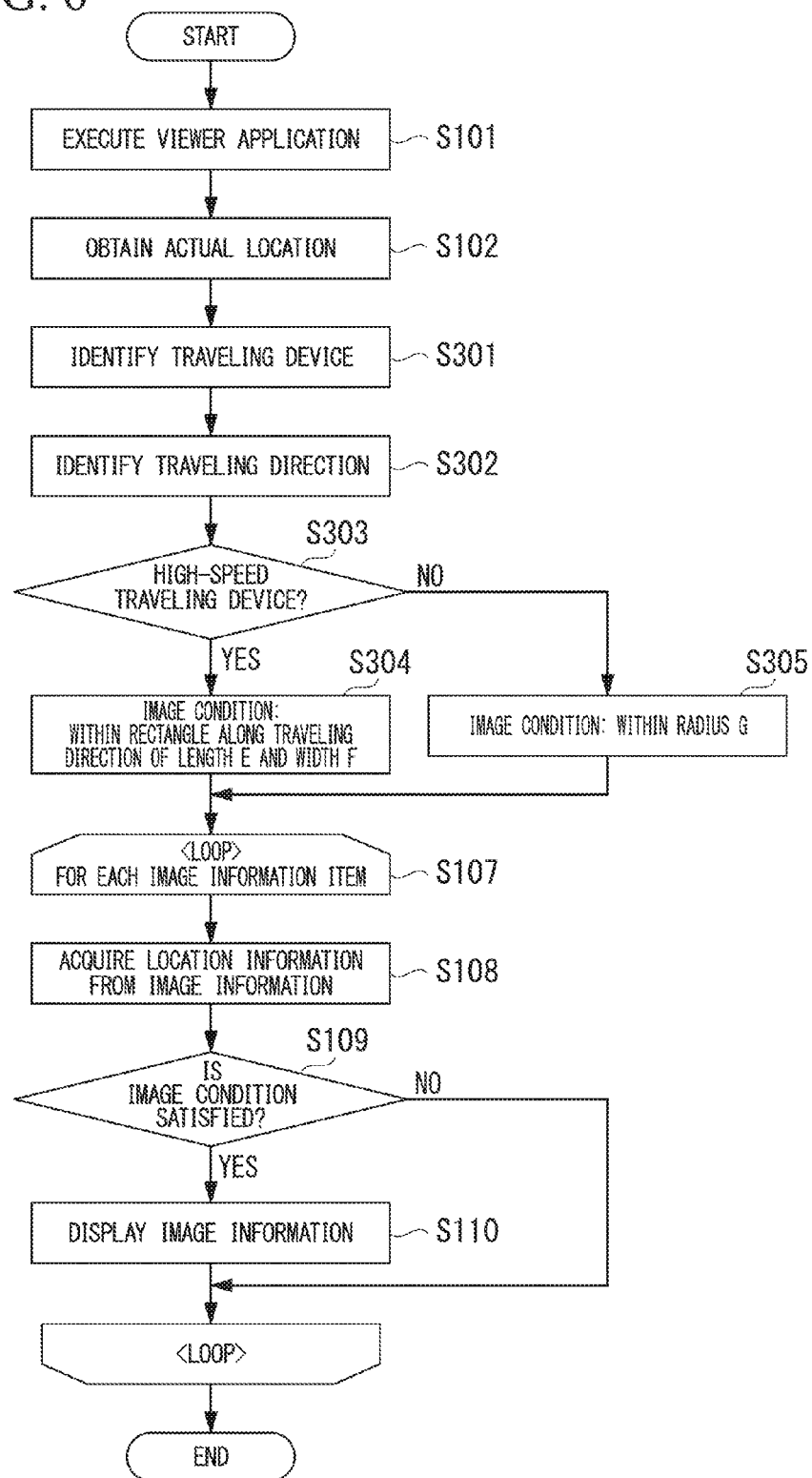
FIG. 6 is a flowchart that shows an image displaying operation of the portable terminal in accordance with the third embodiment.

FIG. 6 is a flowchart that shows an image displaying operation of the portable terminal in accordance with the third embodiment, where steps that perform processes identical to those in the first embodiment are given identical reference symbols.

When the portable terminal executes the viewer application in response to a user's operation (see step S101), the location information obtaining unit 3 obtains location information that indicates the location of the portable terminal at the current time (see step S102). Next, the device status identifying unit 5 identifies the traveling device of the user, as a device status (see step S301).

Below, a method for identifying the traveling device will be explained.

For example, the device status identifying unit 5 measures an acceleration of the portable terminal based on an acceleration sensor thereof, and can identify that the user is traveling by a high-speed traveling device if the acceleration is greater than or equal to a predetermined threshold. In another example, the device status identifying unit 5 receives location information items at two different times from the location information obtaining unit 3, and can identify that the user is traveling by a high-speed traveling device if the distance between two locations indicated by the location information items is greater than or equal to a predetermined threshold.

The above-described methods are each an example of the method of identifying the traveling device, that can be identified by any other method.

After identifying the traveling device in step S301, the device status identifying unit 5 then identifies the traveling direction (see step S302).

In an example of identifying the traveling direction, the device status identifying unit 5 receives location information items at two different times from the location information obtaining unit 3, and can identify the traveling direction based on an angle of a straight line between two locations indicated by the location information items. In another example, the device status identifying unit 5 obtains a direction by utilizing a geomagnetic sensor, and can identify the traveling direction by combining this direction with a direction toward which an acceleration sensor measures an acceleration.

The above-described methods are each an example of the method of identifying the traveling direction, that can be identified by any other method.

Next, the image condition specifying unit 6 refers to the device status and determines whether or not the traveling device is a high-speed traveling device (see step S303).

If determining that the traveling device is a high-speed traveling device (i.e., "YES" in step S303), the image condition specifying unit 6 sets an image condition that image information is displayed if the image information was obtained within a rectangular range defined in a manner such that the rectangle extends from the actual location along the traveling direction identified by the device status identifying unit 5 and that the rectangle has length E in the traveling direction and width F (see step S304).

On the other hand, if determining that traveling device is a low-speed traveling device (i.e., "NO" in step S303), the image condition specifying unit 6 sets an image condition such that image information is displayed if location information included in the image information indicates a location within a circular range defined by radius G around the actual location of the present device as the center of the circle (see step S305).

After the image condition specifying unit 6 specifies the image condition in step S304 or S305, the portable terminal repeatedly executes the following steps S108 to S110 for respective image information items stored in the image storage unit 2 (see step S107).

First, the image retrieving unit 4 retrieves image information (an image information item) from the image storage unit 2, and acquires location information from the retrieved image information (see step S108).

Next, the display determination unit 7 determines whether or not the location information obtained in step S102 by the location information obtaining unit 3 and the location information acquired in step S108 by the image retrieving unit 4 have a relationship that satisfies the image condition specified in step S304 or S305 by the image condition specifying unit 6 (see step S109).

That is, according to the image condition, the display determination unit 7 determines whether or not the location information acquired in step S108 by the image retrieving unit 4 indicates a location (i) within a rectangular range defined in a manner such that the rectangle extends from the location indicated by the location information obtained in step S102 by the location information obtaining unit 3 along the traveling direction identified in step S302 by the device status identifying unit 5 and that the rectangle has a length E in the traveling direction and a width F, or (ii) within a circular range defined by a radius G around the location (as the center of the circle) indicated by the location information obtained in step S102 by the location information obtaining unit 3.

If it is determined by the display determination unit 7 that the image condition is satisfied (i.e., "YES" in step S109), the display determination unit 7 outputs the image information retrieved by the image retrieving unit 4 to the display unit 8.

The display unit 8 then displays the image information received from the display determination unit 7 on the display (see step S110). In contrast, if it is determined by the display determination unit 7 that the image condition is not satisfied (i.e., "NO" in step S109), the display unit 8 does not display the image information retrieved by the image retrieving unit 4.

After the process from step S108 to step S110 is repeatedly executed so that all image information items stored in the image storage unit 2 are processed, the portable terminal completes the relevant operation.

As described above, according to the present embodiment, the device status identifying unit 5 identifies the traveling device of a user. If the traveling device of the user is a high-speed traveling device, the image condition specifying unit 6 specifies the range for the image condition to be a predetermined rectangular range that extends from the actual location of the present device along the traveling direction identified by the device status identifying unit 5. Accordingly, when the portable terminal is moving utilizing a high-speed traveling device, it is possible to exclude images which were obtained at locations which the portable terminal has passed through.

Fourth Embodiment

Next, a fourth embodiment of the present invention will be explained.

Figure 7:
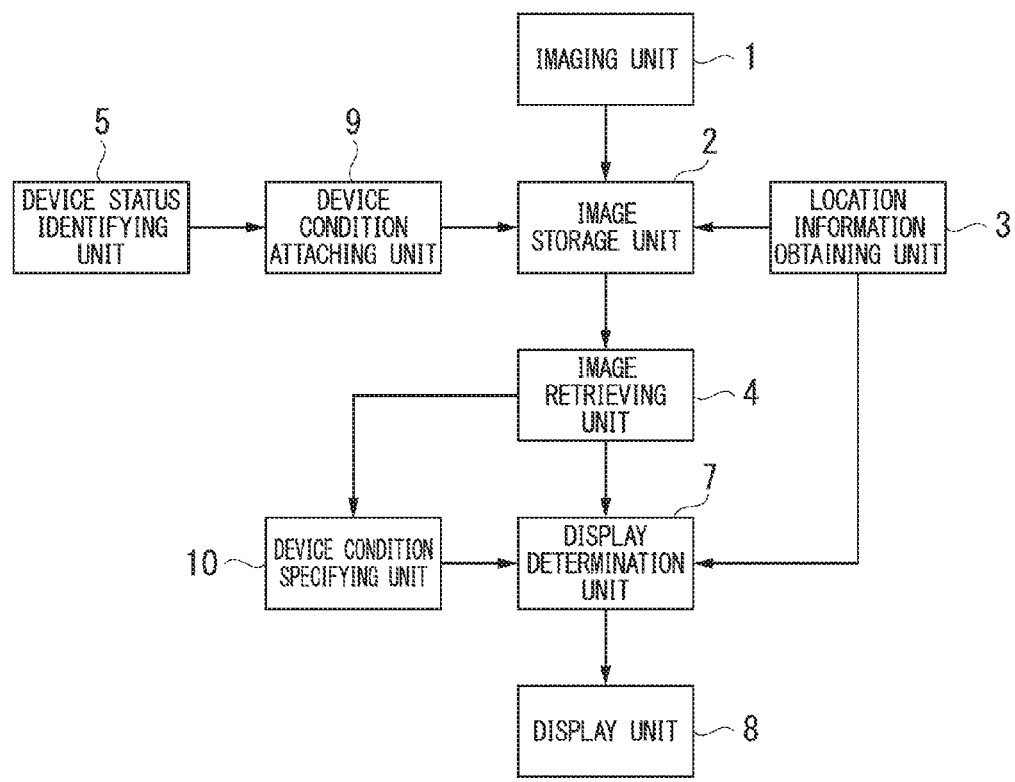
FIG. 7 is a general block diagram that shows the structure of a portable terminal in accordance with a fourth embodiment.

FIG. 7 is a general block diagram that shows the structure of a portable terminal in accordance with the fourth embodiment.

The portable terminal (i.e., an image display device or an image generation device) of the fourth embodiment determines whether or not image information is displayed, based on a device condition included in the image information. The portable terminal has a device condition attaching unit 9 and a device condition specifying unit 10 in place of the image condition specifying unit 6 of the first embodiment.

Based on a device status identified by the device status identifying unit 5 when image information was obtained by the imaging unit 1, the device condition attaching unit 9 specifies a device condition that the portable terminal needs to satisfy so as to display the image condition. The device condition is stored into the image storage unit 2 in a manner such that the device condition is associated with the image information obtained by the imaging unit 1. As examples of the device condition, those similar to the image conditions described in the above first to third embodiments may be utilized.

The device condition specifying unit 10 extracts a device condition from image information retrieved by the image retrieving unit 4 so as to specify the device condition for the image information.

Below, an operation of the portable terminal in accordance with the fourth embodiment will be explained.

Figure 8:
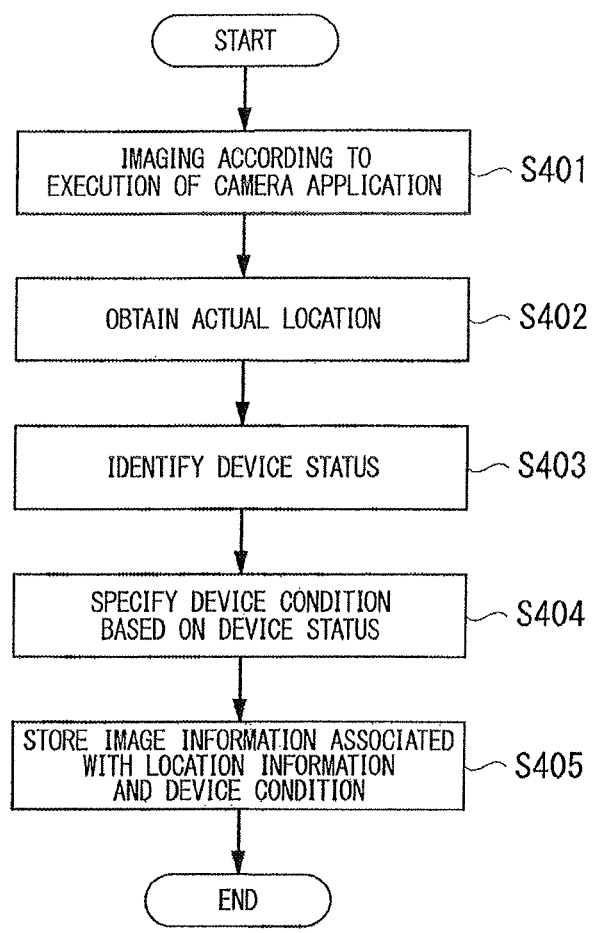
FIG. 8 is a flowchart that shows an image obtaining operation of the portable terminal in accordance with the fourth embodiment.

FIG. 8 is a flowchart that shows an image obtaining operation of the portable terminal in accordance with the fourth embodiment.

The imaging unit 1 is activated when the portable terminal executes the camera application in accordance with a user's operation. Then, when the imaging unit 1 executes an imaging process in accordance with a user's operation (see step S401), the location information obtaining unit 3 obtains location information that indicates the location of the portable terminal at the current time (see step S402).

Next, the device status identifying unit 5 identifies a device status that indicates the status of the portable terminal (see step S403). As described above, examples of the device condition may be conditions such as whether indoors or outdoors described in the first embodiment, whether or not lots of obstacles described in the second embodiment, and a traveling device described in the third embodiment.

Next, the device condition attaching unit 9 specifies the device condition based on the device status identified by the device status identifying unit 5 (see step S404).

The imaging unit 1 then stores the image information obtained in step S401 into the image storage unit 2 in a manner such that the image information is associated with the location information obtained in step S402 by the location information obtaining unit 3 and the device condition specified in step S404 by the device condition attaching unit 9 (see step S405).

Accordingly, the image storage unit 2 stores the image information to which the location information and the device condition are appended.

Figure 9:
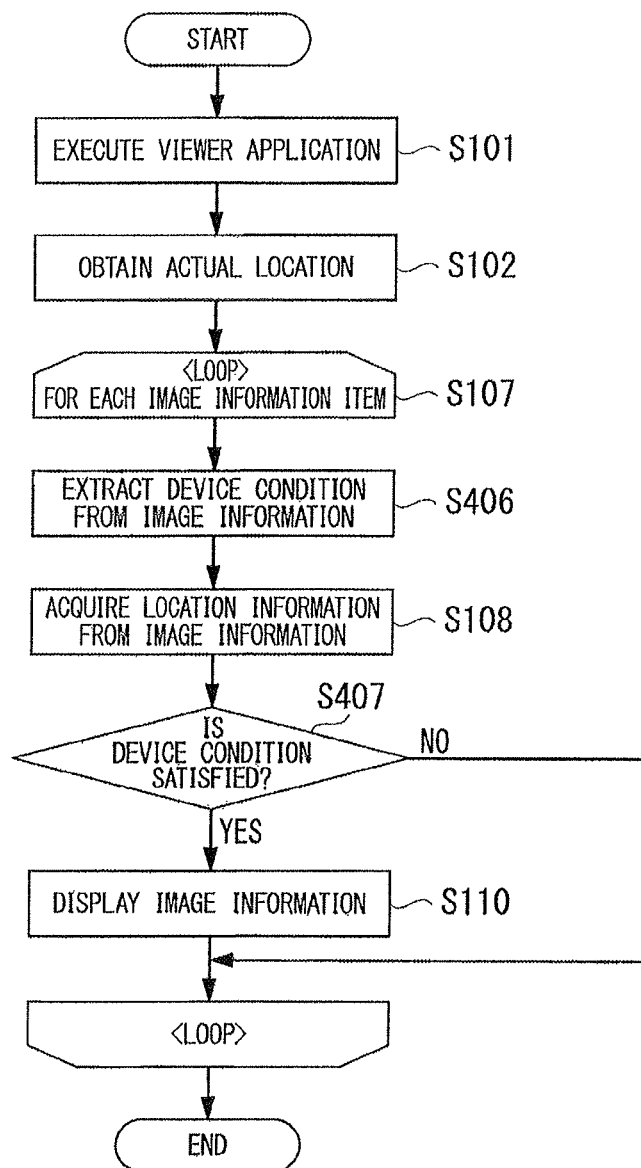
FIG. 9 is a flowchart that shows an image displaying operation of the portable terminal in accordance with the fourth embodiment.

FIG. 9 is a flowchart that shows an image displaying operation of the portable terminal in accordance with the fourth embodiment, where steps that perform processes identical to those in the first embodiment are given identical reference symbols.

When the portable terminal executes the viewer application in response to a user's operation (see step S101), the location information obtaining unit 3 obtains location information that indicates the location of the portable terminal at the current time (see step S102).

Next, the portable terminal repeatedly executes the following steps S406 to S110 for respective image information items stored in the image storage unit 2 (see step S107).

First, the image retrieving unit 4 retrieves image information (an image information item) from the image storage unit 2.

Next, the device condition specifying unit 10 extracts the device condition from the image information retrieved by the image retrieving unit 4 (see step S406).

The image retrieving unit 4 then acquires location information from the image information retrieved in step S107 (see step S108).

Next, the display determination unit 7 determines whether or not the location information obtained in step S102 by the location information obtaining unit 3 and the location information acquired in step S108 by the image retrieving unit 4 have a relationship that satisfies the device condition extracted by the device condition specifying unit 10 (see step S407).

If it is determined by the display determination unit 7 that the image condition is satisfied (i.e., "YES" in step S407), the display determination unit 7 outputs the image information retrieved by the image retrieving unit 4 to the display unit 8. The display unit 8 then displays the image information received from the display determination unit 7 on the display (see step S110).

In contrast, if it is determined by the display determination unit 7 that the image condition is not satisfied (i.e., "NO" in step S407), the display unit 8 does not display the image information retrieved by the image retrieving unit 4.

After the process from step S406 to step S110 is repeatedly executed so that all image information items stored in the image storage unit 2 are processed, the portable terminal completes the relevant operation.

As described above, in accordance with the present embodiment, the device condition attaching unit 9 attaches a device condition to the relevant image information, based on a status identified by the device status identifying unit 5. If the portable terminal satisfies the device condition included in the image information, the display unit 8 displays the image information. Accordingly, the portable terminal can select appropriate image information to be displayed, from among a plurality of image information items.

Fifth Embodiment

Next, a fifth embodiment of the present invention will be explained.

Figure 10:
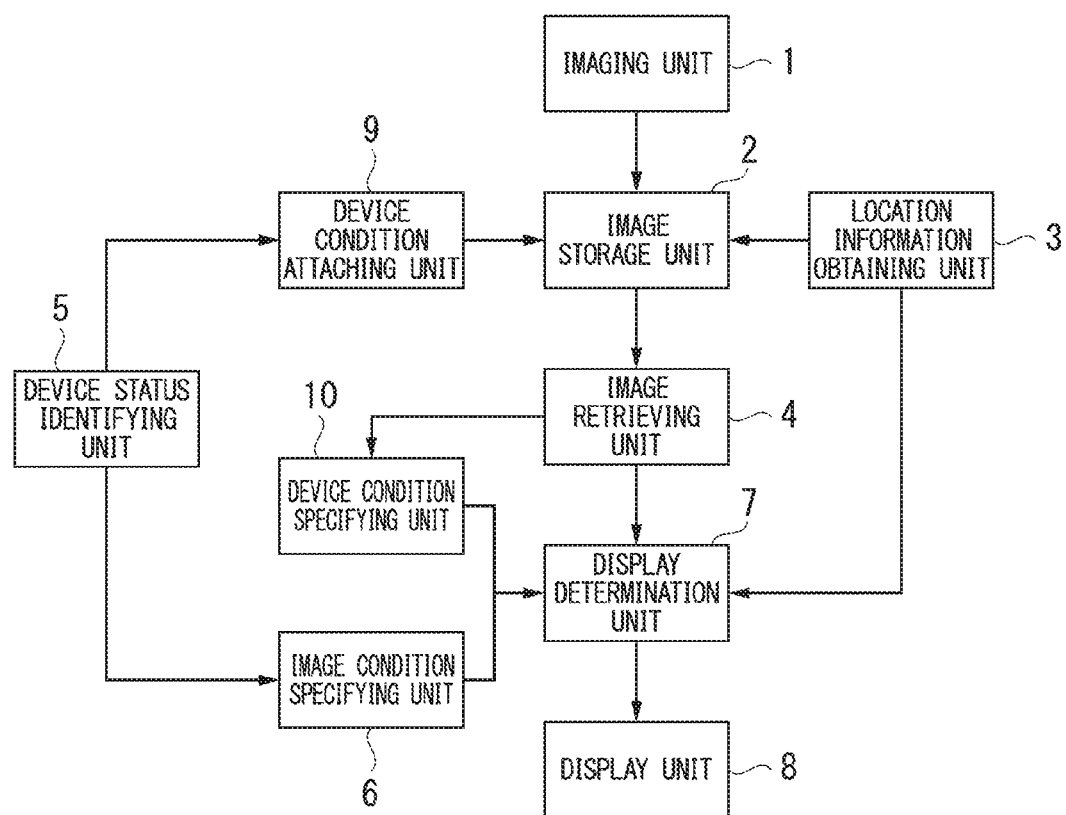
FIG. 10 is a general block diagram that shows the structure of a portable terminal in accordance with a fifth embodiment.

FIG. 10 is a general block diagram that shows the structure of a portable terminal in accordance with the fifth embodiment.

The portable terminal of the fifth embodiment includes both structures of the first embodiment and the fourth embodiment. That is, in the determination for display in the fifth embodiment, image information that satisfies any one of the image condition specified by the image condition specifying unit 6 and the device condition specified by the device condition specifying unit 10 is output to the display unit 8.

Accordingly, the portable terminal of the fifth embodiment can display image information suitable for the current status of the portable terminal, or image information that is determined to be appropriate for display, based on a status when the image information was obtained.

Sixth Embodiment

Next, a sixth embodiment of the present invention will be explained.

The device status identifying unit 5 and the image condition specifying unit 6 in the portable terminal of the sixth embodiment perform processes different from those performed by the corresponding units of the first embodiment.

The device status identifying unit 5 of the sixth embodiment identifies, as circumstantial information on the portable terminal, a person who is present around the portable terminal. In an example of the person identification, information on a face, figure, voice, or the like is acquired by means of image information obtained by the imaging unit 1 or voice information obtained utilizing a microphone.

The image condition specifying unit 6 specifies an image condition such that image information includes the person identified by device status identifying unit 5.

Accordingly, the portable terminal can display image information pertaining to a current (traveling) companion of the user of the portable terminal.

While embodiments of the present invention have been explained in detail referring to the drawings, specific structures are not limited to those described above. Various design modifications can be made without departing from the scope of the present invention.

For example, the above-described embodiments may determine a range for the image information to be a circle having a predetermined radius. However, the range is not limited to this, and may be another-shaped range such as a rectangular range that extends in the traveling direction as described in the third embodiment, or an ellipsoidal range that extends in the traveling direction.

Additionally, in the above-described embodiments, when the image condition is satisfied, the image information is always displayed. However, this is not an absolute condition. In another example of control, the image information is not displayed when the traveling device is a high-speed traveling device.

In addition, in the above-described embodiments, the portable terminal displays image information stored in the image storage unit 2 built in the portable terminal. However, this is not an absolute condition, and the image retrieving unit 4 may acquire image information from an external server apparatus connected via a network, a communication apparatus connected by means of short-distance communication, or the like.

Furthermore, in the above-described fourth embodiment, the device condition attaching unit 9 attaches a device condition to image information, and the device condition specifying unit 10 retrieves the device condition. However, this is not an absolute condition. In another example, the device status identifying unit 5 may attach a identified device status, and the device condition specifying unit 10 may specify a device condition based on the device status included in the image information.

The above-described portable terminal includes a computer system. The operation of each unit is stored as a program in a computer-readable storage medium, and the operation is performed when the relevant computer loads and executes the program.

The above computer readable storage medium is a magnetic disk, magneto optical disk, CD-ROM, DVD-ROM, semiconductor memory, or the like.

In addition, the relevant computer program may be provided to a computer via a communication line, and the computer which received the program may execute the program.

In addition, the program may execute a part of the above-explained functions.

Furthermore, the program may be a so-called "differential file" ("differential program") by which the above-described functions can be executed by a combination of this program and an existing program which has already been stored in the relevant computer system.

INDUSTRIAL APPLICABILITY

In accordance with the present invention, in a relationship between an image display device and image information, the image display device displays the image information if a device condition specified in accordance with a current status of the present device or an image condition included in the image information is satisfied. Accordingly, the image display device can select appropriate image information to be displayed, from among a plurality of image information items.

REFERENCE SYMBOLS 1 imaging unit
2 image storage unit
3 location information obtaining unit
4 image retrieving unit
5 device status identifying unit
6 image condition specifying unit
7 display determination unit
8 display unit
9 device condition attaching unit
10 device condition specifying unit

The invention claimed is:

1. An image display device that displays image information, the device comprising:
 a memory storing instructions; and
 a processor that, when executing the instructions, is configured to:
  retrieve image information;
  extract a device condition from the image information so as to specify the device condition that indicates a condition which the present device needs to satisfy to display the image information; and
  display the image information if a location of the present device satisfies the device condition, wherein:
  the device condition is specified by one of:
   whether the present device is located outdoors or indoors when the present device generates the image information; and
   how many obstacles are there around the present device when the present device generates the image information,
  if it is determined that the present device is located indoors, the device condition is specified as a range to be a narrower range than that specified when it is identified that the present device is located outdoors, and
  if it is identified how many obstacles are there around the present device, the more the obstacles around the present device, the narrower a range for the device condition that is specified.

2. The image display device in accordance with claim 1, wherein the processor is further configured to:
 retrieve image condition that includes range information which indicates a predetermined range,
 wherein the device condition is a condition such that the image information is displayed if a location of the present device is within the range indicated by the range information that is included in the image information.

3. The image display device in accordance with claim 1, wherein
 the device condition is specified by one of:
  whether the present device is located outdoors or indoors when the present device generates the image information;
  how many obstacles are there around the present device when the present device generates the image information; and
  a traveling direction of the present device when the present device generates the image information, and
 if it is identified the traveling direction of the present device, the device condition is specified as a rectangular range that extends from the location of the present device along the traveling direction.

4. An image display method utilizing an image display device that displays image information, the method comprising:
 retrieving image information;
 extracting a device condition from the image information so as to specify the device condition that indicates a condition which the present device needs to satisfy to display the image information; and
 displaying the image information if a location of the present device satisfies the device condition, wherein:
 the device condition is specified by one of:
  whether the present device is located outdoors or indoors when the present device generates the image information; and
  how many obstacles are there around the present device when the present device generates the image information,
 if it is determined that the present device is located indoors, the device condition is specified as a range to be a narrower range than that specified when it is identified that the present device is located outdoors, and
 if it is identified how many obstacles are there around the present device, the more the obstacles around the present device, the narrower a range for the device condition that is specified.

5. The image display method in accordance with claim 4, wherein
 the device condition is specified by one of:
  whether the present device is located outdoors or indoors when the present device generates the image information;
  how many obstacles are there around the present device when the present device generates the image information; and
  a traveling direction of the present device when the present device generates the image information, and
 if it is identified the traveling direction of the present device, the device condition is specified as a rectangular range that extends from the location of the present device along the traveling direction.

6. A non-transitory computer-readable storage medium that stores a program that causes an image display device that displays image information to:
retrieve image information;
extract a device condition from the image information so as to specify the device condition that indicates a condition which the present device needs to satisfy to display the image information; and
display the image information if a location of the present device satisfies the device condition, wherein:
the device condition is specified by one of:
whether the present device is located outdoors or indoors when the present device generates the image information; and
how many obstacles are there around the present device when the present device generates the image information,
if it is determined that the present device is located indoors, the device condition is specified as a range to be a narrower range than that specified when it is identified that the present device is located outdoors, and
if it is identified how many obstacles are there around the present device, the more the obstacles around the present device, the narrower a range for the device condition that is specified.

7. The image display method in accordance with claim 6, wherein
the device condition is specified by one of:
whether the present device is located outdoors or indoors when the present device generates the image information;
how many obstacles are there around the present device when the present device generates the image information; and
a traveling direction of the present device when the present device generates the image information, and
if it is identified the traveling direction of the present device, the device condition is specified as a rectangular range that extends from the location of the present device along the traveling direction.

* * * * *